June 17, 1930.  R. M. GALLOWAY  1,764,099
CONTROL VALVE MECHANISM
Filed May 27, 1927    3 Sheets-Sheet 3

Inventor
Robert M. Galloway
By Attorneys
Nathan & Bowman

Patented June 17, 1930

1,764,099

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

CONTROL-VALVE MECHANISM

Application filed May 27, 1927. Serial No. 194,746.

This invention relates to valve mechanisms for controlling the action of hydraulic transmissions such, for example, as are used to effect reciprocatory movement of an element forming a part of a machine tool.

Many types of machine tools include an element required to be translated in forward and reverse direction and at varying rates. A drilling machine is a good example of a machine tool of this nature, the drill head constituting the element to be translated and the varying rates of travel being utilized 1st: rapidly to move the head forwardly to advance the tools to the work; 2nd: slowly to feed the drills into the work while they are being rotated; and 3rd: rapidly to retract the tools after the drilling operation is completed.

This invention has for an object to provide an improved and simplified valve mechanism for so controlling the operation of the hydraulic transmission that a reciprocable member automatically may be given its various rates and directions of movement in a predetermined sequence.

Another object of the invention is to provide an improved and simplified valve mechanism, for the above noted purpose, by means of which the rate of slow feed of the translatable member may be very accurately regulated.

Still another object is to provide an improvide and simplified valve mechanism for the above noted purpose which is easy and inexpensive to manufacture, which completely excludes all dirt, chips, and other foreign matter, and which more readily may be actuated than prior devices.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figures 1, 2:
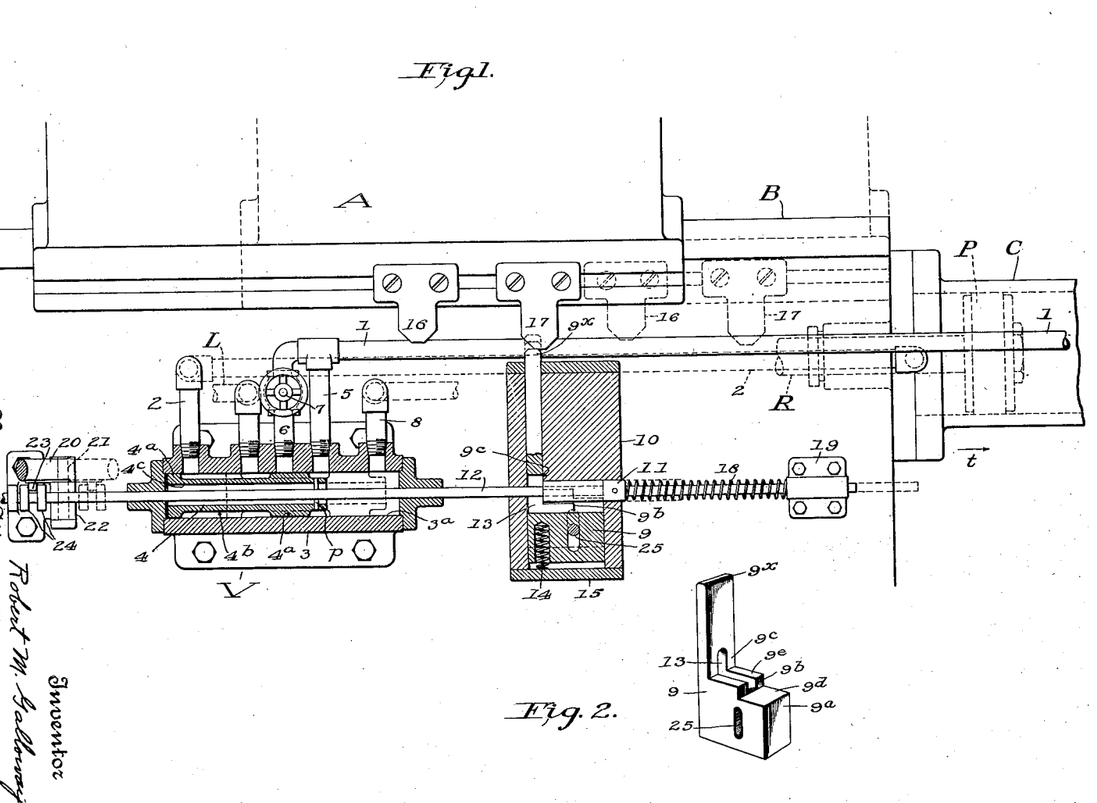
Fig. 1 is a longitudinal sectional view of the improved valve mechanism showing it applied to a portion of a machine tool, the parts being shown in the positions they assume just at the completion of the forward movement of translatable member and just prior to the return movement of said member.
Fig. 2 is a perspective view of an interference member which controls the movement of the valve.

The valve controlling mechanism illustrated in Figs. 1 and 2 is similar to that disclosed in Fig. 22 of my pending application Serial Number 125,869 filed July 30, 1926 of which this application is in part a division.

Referring more specifically to the drawings, the invention is illustrated in connection with a hydraulic transmission adapted to be utilized to reciprocate a member A on a stationary support B. Many types of machine tools comprise relatively reciprocable members and for the purpose of this disclosure the member B may be considered the stationary frame of a drilling machine and A may be considered the translatable drill head. It is to be understood however that this invention is neither limited to drilling machines specifically nor to machine tools generally.

To effect relative movement between the members A and B a usual type of hydraulic transmission may be employed. This transmission may comprise a cylinder C, secured to the stationary frame B, a piston P slidingly fitted in the cylinder and a piston rod R having one end attached to the piston and the other end connected with the translatable member A as shown at D in Fig. 3. Fluid pressure conduits 1 and 2 connect with the cylinder C at opposite ends of the piston and by alternately admitting fluid into the cylinder through the conduits 1 and 2 the piston, and the member A connected thereto, will be caused to reciprocate. The rate of reciprocation is dependent upon the rate of flow of fluid into the cylinder. It will therefore be perceived that if fluid is admitted into the cylinder at a rapid rate the tool head will be given a rapid movement which conveniently may be utilized rapidly to bring the tools from their retracted position to a position wherein they almost engage the work, and also to again retract the tool head after the tooling operation has been completed. Likewise, when fluid is admitted into the cylinder at a slow rate the tool head is given a slow movement which may be utilized to feed the tools into the work during the drilling operation.

The present invention provides improved means for automatically and alternately connecting the conduits 1 and 2 with a suitable source of fluid pressure and for varying the rate of flow through one of said conduits. The embodiment of the invention illustrated in Figs. 1 and 2 includes a valve designated generally as V and comprising a hollow casing 3 to which is connected a fluid pressure line L, receiving fluid pressure from any suitable source. The conduits 1 and 2 also are connected with the casing 3 and alternately are brought into communication with the pressure line through the bodily movement of a valve piston 4. This valve piston is formed with enlarged end portions $4^a$, slidingly fitted within a bore $3^a$ in the casing 3, and a reduced intermediate portion $4^b$ comprising a fluid passage. Fig. 1 shows the valve piston in the position in which it has been shifted to effect rapid return movement of the member A and therefore the position in which the valve remains when the machine comes to rest. It will be observed that in this position the pressure line L is connected with the conduit 2. The conduit 1 has two operative connections with the valve casing 3. One of these connections comprises a large capacity pipe 5, and the other consists of a pipe 6 provided with a flow-restricting valve 7. Thus it will be understood that when the pressure line is connected with the pipe 5 a large volume of fluid will be admitted into the cylinder C which will effect rapid movement of the piston P and the head connected therewith. When the pipe 6 is connected with the pressure line, to the exclusion of the pipe 5, the rate of flow into the cylinder will be greatly reduced due to the setting of the speed regulating valve 7 and the head A will be given a slow feeding movement. A drain pipe 8 also is connected with the casing 3 and serves to return to a suitable sump, the fluid exhausted from the cylinder C. With the valve in the position shown in full lines in Fig. 1 the pressure line is connected with the conduit 2 and therefore fluid under pressure enters the left end of the cylinder, causing the piston to be moved in the direction indicated by the arrow $t$. During this movement of the piston the fluid in the right end of the cylinder is exhausted through the conduit 1, pipe 5, through the bore $3^a$ and pipe 8 to the sump. Likewise when the valve is in a position to connect the pressure line with the conduit 1 (through either pipes 5 or 6) the reverse movement of the piston is effected and the fluid in the left end of the cylinder is exhausted through conduit 2, bore $3^a$ and pipe 8 to the sump. To permit the fluid to flow from the pipe 2 to the pipe 8 the valve piston is formed with a central bore $4^c$.

An important feature of this invention resides in the automatic means for shifting the valve piston from one position to another thereby to vary the rate and direction of movement of the member A. As shown in Figs. 1 and 2 this means comprises an interference member 9 slidingly fitted in a suitable bearing bracket 10, which may be supported by the base B. This interference member is provided with three abutment surfaces $9^a$, $9^b$ and $9^c$ (see Fig. 2) adapted in certain positions of said member to be in the path of a stop shoulder provided by a collar 11 fixed upon a rod 12 extending through a slot 13 in said interference member and to which the valve piston 4 also is secured, as by a pin $p$. A coil spring 14, seated within a cavity in the member 9, has one end resting upon a plate 15 attached to the bracket 10 and normally acts to move said member upwardly to place the upper projecting end $9^x$ thereof in the path of dogs 16 and 17 adjustably mounted on the movable member A. A second coil spring 18, surrounding the rod 12 and interposed between the collar 11 and a bearing bracket 19, in which one end of the rod is slidingly fitted, normally acts to force the rod 12, and the valve piston 4 connected therewith, toward the left to the position shown in full lines, in which the valve effects rapid retraction of the member A. This movement is however, sometimes obstructed by the abutment surfaces $9^a$, and $9^b$ and the rod and the parts connected therewith are permitted to move under the influence of the spring only as the abutment surfaces are taken out of the path of the collar 11. The dogs 16 and 17 act upon the member 9 at predetermined points in the cycle to depress it and thereby intermittently and successively to remove the surfaces 9ᵃ and 9ᵇ out of the path of the collar thereby permitting the valve piston to be moved to vary the rate and direction of movement of the member A, as will now be explained.

Pre-supposing that the machine has completed a cycle and come to rest. The valve piston will be in the position shown in full lines in Fig. 1 and the member A will be in the dotted line position. To initiate a new cycle the operator grasps a lever 20, pivoted at 21 to a bracket 22, and moves it toward the right. This lever carries a stud 23 arranged between collars 24 secured to the rod 12, whereby this movement of the lever shifts the rod, the valve piston 4 and the collar 11 from their full line positions to their dotted line positions, in opposition to the spring 18. As the collar 11 is moved out of the path of horizontal flats 9ᵈ and 9ᵉ on the member 9 this member is moved vertically, by the spring 14, from its full line position to its uppermost dotted position in which the upper end 9ˣ thereof is in the path of movement of the dog 16. Extreme upward movement of the interference member (which is limited by the pin and slot connection 25) places the abutment surface 9ᵃ in the path of the collar 11 which is held thereagainst by the spring 18. In this adjusted position of the valve piston 4 the pressure line L is isolated from the conduit 2 and connected with the conduit 1 through both the restricted flow pipe 6 and the large capacity pipe 5 whereupon fluid under pressure is admitted into the right end of the cylinder at a rapid rate and consequently the piston P and the member A connected therewith are rapidly moved to the left, it being understood that during movement of the piston to the left the fluid in the left end of the cylinder is exhausted through conduit 2, bore 4ᶜ and pipe 8 to a sump. This traverse may be utilized rapidly to bring tools carried by the member A, substantially into contact with a work-piece. As the head A is traversed toward the left the dog 16 engages the upper end 9ˣ of the interference member 9 and depresses it thereby moving the abutment surface 9ᵃ out of the path of the collar 11 which, together with the rod 12 and valve piston 4, are moved toward the left until the collar 11 abuts the surface 9ᵇ of the interference member. This movement of the valve piston causes the enlarged portion 4ᵃ thereof to close the port leading to the pipe 5 but maintains the pipe 6 in connection with the fluid pressure line whereby the flow of fluid into the right end of the cylinders is greatly reduced, correspondingly reducing the rate (but not varying the direction) of travel of the member A. This slow motion may be utilized to feed tools into a work-piece and the rate thereof may be regulated by adjustment of the valve 7.

A continued movement of the member A causes the dog 17 also to engage and depress the interference member thereby moving the abutment surface 9ᵇ out of the path of the collar whereupon the spring 18 again moves the rod 12, and the collar 11 and valve piston 4 carried thereby to the positions shown in full lines. It will be understood that in a machine tool this last movement of the valve will take place when the machining operation has been completed and that the extent of rapid traverse and slow feed may be varied by adjustment of the dogs 16 and 17.

In the last named position of the valve piston the pressure line is disconnected from the pipes 5 and 6 and is connected with the conduit 2 whereupon fluid, under pressure, flows at a rapid rate into the left end of the cylinder C thereby retracting the member A to its dotted line position where it may be stopped by any suitable means. During retraction of the member A the fluid in the right end of the cylinder C is exhausted through the conduit 1, pipe 5, bore 3ᵃ and pipe 8 to a suitable sump.

The embodiment of the invention disclosed in Figs. 3 to 8 inclusive operates on the same principle as does that shown in Figs. 1 and 2 but the structural details thereof are somewhat different. In so far as the parts are similar the same reference characters have been used and in view of the fact that these parts have already been described further description thereof is deemed unnecessary. This modified construction comprises a valve casing 30 (see Figs. 3 and 5) to which are connected a fluid pressure line L, a drain 8 and conduits 1 and 2 connected with opposite ends of the cylinder C. Within a cylindrical bore 31 in the casing 30 there is fitted a sleeve 32 formed with external annular grooves 33, 34 and 35 constituting chambers which are in constant communication, respectively, with the pressure line L and the conduits 1 and 2. Ports 36, 37 and 38 extend from the grooves 33, 34 and 35 to an axial bore 39 in said sleeve, within which bore is slidingly fitted a valve piston 40 later to be referred to. An end cap 41 closes one end of the casing 30 and provides a bearing 41ᵃ for a valve rod 42 to which the valve piston 40 is connected. The drain pipe 8 is connected with the cap 41 and communicates with a bore 43 therein which in turn opens into the bore 39 of the sleeve 32. The opposite end of the casing is closed by a sub-casing 44, providing a bearing 45 for the rod 42, and is formed with a bore 46 within which is slidingly fitted an interference member 47, later to be referred to.

Figure 3:
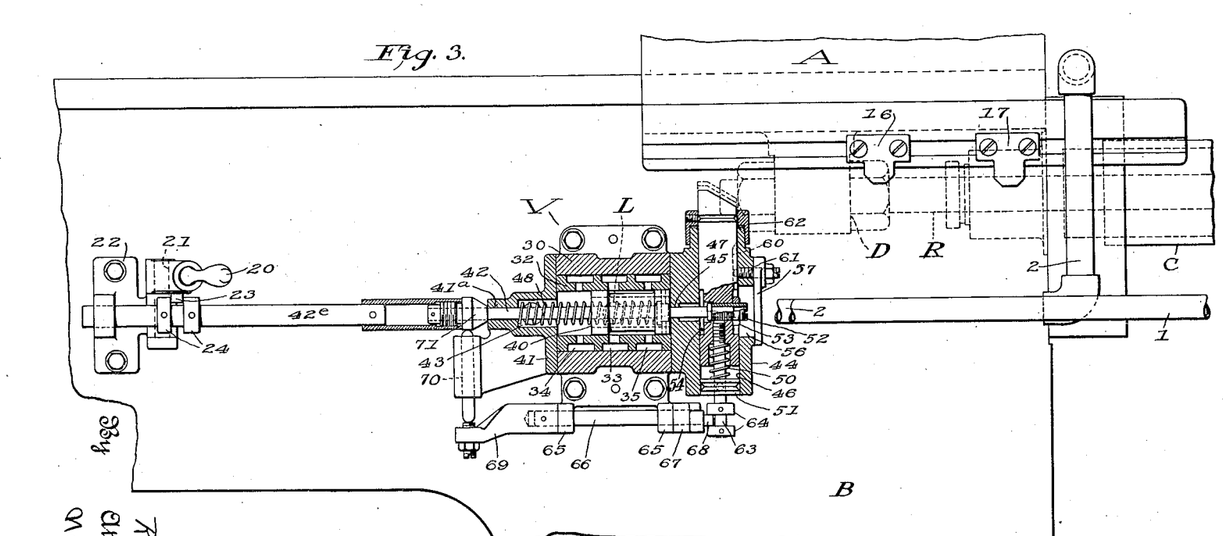
Fig. 3 is a view similar to Fig. 1 but showing a modified form of valve mechanism.
Figure 4:
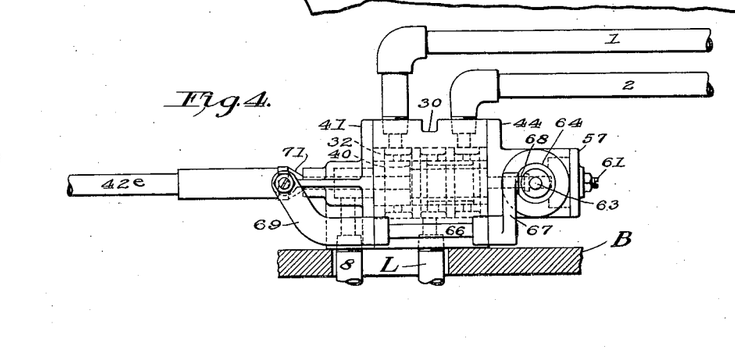
Fig. 4 is a bottom view of the valve shown in Fig. 3.
Figure 5:
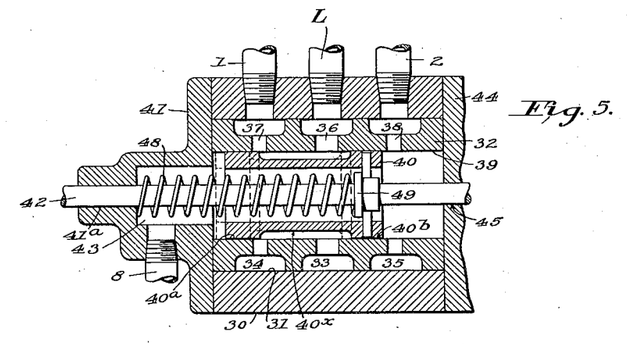
Fig. 5 is a detail sectional view of the valve, showing, in dotted lines, the valve in position to effect rapid forward traverse of the translatable member; and in full lines the position to effect slow forward feed, the various ports being shown out of their normal positions and in a single plane better to illustrate the flow of fluid through the valve. The interference member, in its various positions, controls the movement of the valve piston and thereby determines the rate and direction of movement of the translatable member.
Figure 6:
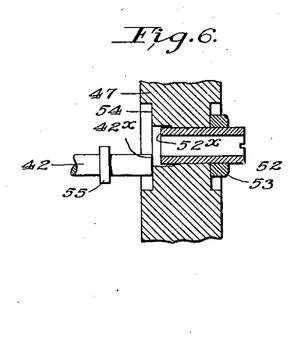
Figs. 6, 7 and 8 are detail views showing the interference member of Fig. 3 in three different positions with respect to the valve control rod, which positions effect rapid forward, slow forward and rapid return of the translatable member.

Referring to Fig. 5, the valve piston 40 is formed with enlarged end portions 40ᵃ and 40ᵇ slidingly fitted to the bore 39 in the sleeve member 32, and a reduced intermediate portion 40ˣ which constitutes a fluid passage, whereby, when the valve piston is in its extreme right position as shown in Figs. 3 and 4, it connects the fluid pressure line L with the conduit 2 and effects rapid retraction of the member A. When the piston 40 is shifted to the position shown in dotted lines in Fig. 5 it connects the pressure line with the conduit 1 and effects rapid forward traverse of the member A.

This invention provides means whereby, after the member A has been traversed a predetermined distance the valve piston automatically may be moved to a position wherein it will partially close the ports 37 and thereby permit only a slow flow of fluid from the pressure line into the conduit 1. This will discontinue the rapid traverse of the head A and give to it a relatively slow motion which may be utilized to feed tools into a work-piece. This last named position of the valve piston is shown in full lines in Fig. 5. The means for automatically shifting the piston 40 to its various positions, thereby to vary the rate and direction of movement of the member A, differs in structural details from the means shown in Figs. 1 and 2 for the same purpose, but they both operate on the same general principle. In the modified construction a coil spring 48, surrounding the rod 42 and interposed between the end cap 41 and a collar 49, secured to said rod, normally tends to move the rod and the valve piston connected thereto toward the right to the position shown in Fig. 3 in which it effects rapid retraction of the member A. This movement, however, is controlled by the interference member 47 in a manner similar to the action of the interference member 9 hereinbefore described. The interference member is slidingly fitted within the sub-casing 44 and normally is urged upwardly by a spring 50 interposed between said member and an abutment and guide block 51 fixed within the bore 46. Within the interference member there is adjustably mounted, as by screw threads, a sleeve 52 in the nature of a hollow screw. This sleeve may be adjusted axially and maintained in adjusted positions by a lock nut 53. The interference member 47 is formed with an abutment surface 54 against which (in one position of the member) bears the end 42ˣ of the rod 42 thereby maintaining the valve piston in rapid traverse forward position. The end 52ˣ of the sleeve also constitutes an abutment for the rod 42 and inasmuch as this end is located back of the surface 54 it effects a different position of the valve piston 40. The end 52ˣ also serves (in another position of the member 47) as an abutment for a collar 55 secured to the rod 42, the end 42ˣ of the rod then extending into the hollow sleeve 52. This places the valve piston in a position to effect rapid return of the member A.

Dogs 16 and 17 adjustably mounted on the translatable member A act, during forward movement of said member, successively to depress the interference member, whereupon the surface 54, and the end 52ˣ of the sleeve 52 are moved out of the path of the end 42ˣ thereby permitting the valve piston to be shifted in predetermined steps from the position shown in dotted lines in Fig. 5 to that shown in Fig. 3. Manual means, comprising a lever 20 fulcrumed at 21 on a bracket 22 and having a stud 23 located between spaced collars 24 affixed to an extension 42ᵉ of the rod 42, serves (when the lever is moved to the left in Fig. 3) to reset the valve piston to initiate a new cycle.

Figure 7:
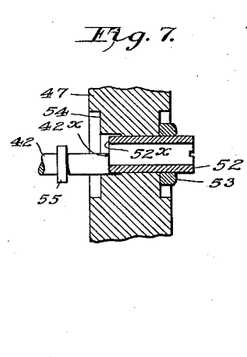
Figure 8:
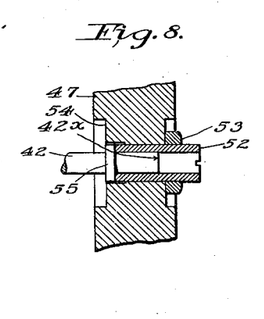

The cycle of operation is as follows:—The member A having come to rest in the position shown in Fig. 3 with the valve piston also in the position shown, the operator grasps the lever 20 and moves it toward the left in opposition to the spring 48. This shifts the rod 42ᵉ—42 and withdraws the end 42ˣ from the sleeve 52 and permits the member 47 to be elevated by the spring 50 until the surface 54 is in the path of movement of the end 42ˣ. (See Fig. 6). This also moves the valve piston to the dotted line positions shown in Fig. 5 thereby connecting the pressure line L with the conduit 1 whereupon fluid under pressure rapidly enters the left end of the cylinder C and effects rapid forward traverse of the member A. At a predetermined point, the dog 16 engages the upper end of the interference member thereby depressing it and moving the surface 54 out of the path of the end 42ˣ of the valve rod 42, whereupon the spring 48 moves the rod 42 and the valve piston 40 to the right until the end 42ˣ engages the end 52ˣ of the adjustable sleeve 52, as shown in Fig 7. This movement of the valve piston causes the enlarged portion 40ᵃ of the piston 40 partly to close the ports 37 thereby reducing the flow of fluid through the conduit 1 and reducing the rate of travel, of the head A. Further translation of the member A at the slow rate brings the dog 17 into engagement with the interference member thereby further depressing it and shifting the end of the sleeve 52 out of the path of the rod end 42ˣ. As the bore in the sleeve 52 is brought into alignment with the end 42ˣ the latter is moved into the sleeve until the collar 55 engages the end 52ˣ thereof (see Fig. 8). This places the valve piston in a position where it connects the fluid pressure line with the conduit 2 thereby admitting fluid into the left end of the cylinder and effecting rapid retraction of the member A.

It will readily be perceived that the amount of partial closing of the ports 37 may be determined by adjustment of the sleeve 52 and that therefore the rate of feed may be regulated to a nicety. To give access to the screw sleeve 52 the slotted end thereof is arranged in a chamber 56 in the sub-casing 44 and a plate 57 serves to close said chamber to exclude dirt. The construction and arrangement of the distributor sleeve 32 in the casing 30 affords convenient means for varying the rate of rapid traverse inasmuch as the member 32 may be taken out and replaced by a similar member having ports 37 and 38 of different area.

To prevent rotation of the interference member 47 in the bore 46 the member is formed with a groove 60 which is entered by the point of a screw 61 sustained by the sub-casing 44. A sleeve 62 fitted upon the projecting portion of the member 47 extends down over and is slidingly fitted upon, a portion of the sub-casing 44 thereby excluding dirt, chips etc. from the sub-casing.

To maintain the free end rod 42 strain free when the dog 17 has been retracted from the member 47 positively acting means is provided for taking the force of the spring 50. To that end, a rod 63 is connected with the interference member 47 and extends through the spring 50 and block 51. Spaced collars 64 are secured upon the projecting end of the rod 63. Journaled in bearings 65, provided by the bracket which supports the casing 30, is a rock-shaft 66 to one end of which is secured an arm 67 which carries a roller 68 arranged between the collars 64. To the other end of the shaft 66 is secured an arm 69 adapted to act upon one end of a slide pin 70 translatably mounted in a bearing provided by the cap 41. The other end of the pin 70 engages a cone 71 fixed upon the rod 42, whereby when the rod and cone are shifted to the right to effect rapid retraction of the member A the elements 71, 70, 69, 66, 67, 68, 64 and 63 co-operate to take the pressure exerted by the spring 50 and thereby maintain the rod 42 strain free and freely movable. As the rod 42 is moved to the left to reset the valve the pin 70 rides down the cone and through the elements above described releases the spring and permits it to act upon the interference member to elevate it.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In combination, a translatable member; fluid pressure means to translate said member; a valve to control the rate and direction of translation of said member; means tending to move said valve through a plurality of positions each of which effects a different translation of said member; a member movable with said valve and providing a stop-shoulder; an interference member provided with a plurality of abutment surfaces adapted successively to engage said stop-shoulder to limit the movement of said valve; and a plurality of dogs carried by said translatable member and acting successively to depress said interference member to cause said abutment surfaces successively to release said stop-shoulder thereby to permit said valve to be moved to its various operative positions.

2. A control device for hydraulic transmissions combining a fluid pressure line; first and second fluid conduits connected with said transmission; a valve mechanism for alternately connecting said fluid pressure line with said fluid conduits, said valve mechanism comprising a casing provided with a bore with which the pressure line and the conduits communicate, and a valve piston slidable in said bore and provided with a fluid passage-way adapted in one position of the valve piston to connect the pressure line with one of said conduits and in another position to connect the pressure line with the other conduit; manual means to move said valve piston from a position in which it effects communication between the pressure line and said first conduit to a position in which it effects communication to the second conduit; pressure means acting upon said valve tending to return it to its initial position; a single interference member acting to prevent return movement of said valve; automatic means acting to render said interference member partially ineffective thereby to permit said valve to be moved to a position to reduce the flow of fluid through said second conduit; and means to render said interference member ineffective a second time thereby to permit said valve to move to isolate the second conduit from said pressure line and to connect the first conduit therewith.

3. A control device for hydraulic transmissions combining a fluid pressure line; first and second fluid conduits connected with said transmission; valve mechanism adapted alternately to connect said fluid pressure line with said fluid conduits, said valve mechanism including a rate and direction control element; manual means to shift said element in one direction to a position wherein it effects a flow of fluid from said pressure line to one of said conduits at a relatively rapid rate; means tending to shift said member in the opposite direction; an interference member providing a plurality of stop surfaces co-operating with a shoulder movable with said control element adapted successively to prevent the movement of said element; and means to give said member a plurality of movements successively to render said stop surfaces ineffective thereby permitting movement of said control element first to vary the rate of flow through said first conduit and then to effect flow at a rapid rate from said pressure line to said second conduit.

4. A control device for hydraulic transmissions combining a fluid pressure line; first and second fluid conduits connected with said transmission; valve mechanism including a rate and direction control element adapted alternately to connect said fluid pressure line with said conduits; means tending to shift said control element in one direction; an interference member having a retaining portion which acts to maintain the element in a position where it effects a maximum flow of fluid from said pressure line to said first conduit; means to shift said interference member temporarily to render it ineffective, thereby to permit shifting of said element to a position where it effects a reduced flow of fluid from the pressure line to the first conduit; a second portion on said interference member adapted temporarily to hold said element in the last named position; and second means to shift said interference member to render it ineffective to retain said control element in the last named position thereby to permit said element to be moved to a position where it effects communication between said fluid pressure line and said second conduit.

5. A control device for hydraulic transmissions combining a fluid pressure line; first and second fluid conduits connected with said transmission; valve mechanism adapted alternately to connect said fluid pressure line with said conduits, said valve mechanism comprising a casing; a sleeve arranged within said casing and provided with an intake port permanently connected with said pressure line and two other ports each connected with one of said conduits, a member slidingly fitted within said casing and provided with a fluid passage; manual means to shift said member to a position to effect maximum flow from said intake port to one of the other ports; means tending to shift said member to a position to connect said intake port with the other of said ports; retaining means to hold said member in its shifted position; and automatic means actuated by the hydraulic transmission to render said retaining means ineffective, thereby to permit said member to be moved to a position wherein it connects said intake port with the other of said ports.

6. A control device as set forth in claim 5, in which the retaining means comprises a spring-pressed element having a plurality of abutment surfaces adapted successively to be shifted into the path of movement of said member, one of said surfaces being adjustable to vary the position of said member thereby to vary the rate of action of said hydraulic transmission.

7. A control device for hydraulic transmission comprising a fluid pressure line; two fluid conduits connected with said transmission; a valve casing to which said piston movable in said casing and adapted in a plurality of positions to connect the pressure line with said conduits; means tending to move said piston axially; a rod connected with said piston; an interference member provided with a first abutment surface adapted to be engaged by said rod temporarily to prevent movement of said rod and piston in one direction; a second abutment provided by said interference member and adapted to be engaged by said rod temporarily to maintain said rod and valve piston in another position; means to adjust the last named abutment axially of said rod to vary the position of said valve piston; means to shift said interference member a plurality of times transverse to the movement of said rod to move said abutments out of the path of said rod; and a stop shoulder carried by said rod remote from its end and adapted to engage said adjustable stop when the latter has been moved out of the path of said rod.

8. In combination, a hydraulic transmission including a cylinder, a piston movable therein, first and second conduits connected with opposite ends of said cylinder; a fluid pressure line; a valve mechanism adapted alternately to connect said pressure line with said conduits, said valve mechanism comprising a casing to which are connected the fluid pressure line and said conduits; a fluid distributing piston slidably mounted within said casing; resilient means tending to shift said piston in one direction; manual means to shift said piston in the opposite direction; an interference member having a first stop adapted to maintain said valve piston in one position; automatic means to render said first stop ineffective; a second stop provided by said interference member adapted to arrest the movement of said piston and maintain it in a position wherein it reduces the flow of fluid from said pressure line to said first conduit to reduce the rate of movement of said translatable member; means to vary the position of said stop thereby to vary the rate of slow movement of said translatable member; and means to render said second stop ineffective thereby to permit said valve piston to be moved to a position wherein it connects the fluid pressure line with said second conduit.

9. The combination set forth in claim 8 in which the interference member comprises a spring pressed slide rod and the means for rendering said member ineffective comprises dogs, carried by a member, movable with said piston, which act to shift said rod in opposition to the spring pressure thereon; also in which the first stop comprises an abutment surface on said interference member and in which the second stop consists of a screw threaded into and adjustable relative to said interference member.

10. A control device for hydraulic transmissions combining a fluid pressure line; two fluid conduits connected with said transmission; a valve connected with said pressure line and with said conduits and adapted to control the flow of fluid from the former to the latter, said valve comprising a closed casing, a rod slidable in said casing; a fluid distributing member secured to said rod and movable in said casing; a spring located within said casing and acting to shift said member to a position wherein it connects said pressure line with one of said conduits; manual means to shift said distributing member in opposition to said spring to a position wherein it connects the fluid pressure line with the other of said conduits; spring pressed interference means, acting on a free end of said rod in opposition to said member shifting spring temporarily to prevent movement of said distributing member; automatic means to render said interference means ineffective; and means to maintain the free end of said rod strain free after said interference member has been rendered ineffective.

11. Fluid control means for fluid actuating means for machine tools comprising valve means operable to a plurality of open positions to vary the rate of flow of pressure fluid to effect movement of an element of a machine tool at a plurality of rates in a single direction; impositive means connected to urge the valve in one direction; means to move said valve against the force of said impositive means; detent means for restraining said valve in one of said open positions against the force of said impositive means; and means for actuating said detent means to permit the impositive means to move said valve to a second one of said open positions to vary the rate of movement of said element.

12. A movable member; fluid actuating means therefor; and fluid control means for said actuating means to vary the speed of operation of said movable member in a single direction, said fluid control means comprising valve means operable to various open positions to vary the rate of fluid flow; impositive means tending to urge said valve in one direction; means for moving said valve in the opposite direction against said impositive means; interference means for restraining said valve against said impositive means in one of said open positions; and means for releasing said interference means to permit said valve to move to a second of said open positions.

13. In combination, a translatable member; a hydraulic motor connected to translate said member; a fluid pressure line; a valve to control the rate and direction of flow of fluid from said pressure line to said motor; means to move said valve from an initial position to a position in which it effects a flow of fluid into one end of said motor to move said member in one direction at a predetermined rate; means tending to return said valve to its initial position; detent means acting to hold said valve in its adjusted position; means, actuated in timed relation with the movement of said translatable member to release said detent means thereby to permit said valve to be moved to an intermediate position in which it effects flow of fluid into the said end of said motor at a materially different rate to vary the rate of movement of said translatable member; second detent means to hold said valve in its intermediate position; second means actuated in timed relation with the movement of said member to release said second detent means to permit the valve to be moved to its initial position to effect retraction of said translatable member.

14. A control for a hydraulic motor combining a fluid pressure line; conduits connected with opposite ends of said motor and adapted to be connected with said pressure line to effect alternately forward and reverse action of said motor; a valve for controlling the flow of fluid from said pressure line to said conduits and to vary the rate of flow into one end of said motor; means to move said valve from an initial position to another position to effect a predetermined flow from said pressure line into one end of said motor; means tending to return said valve to its initial position; retaining means to hold said valve in its adjusted position; first means to render said retaining means ineffective thereby to permit said valve to be moved to an intermediate position to vary the flow of fluid from said pressure line to said one end of said motor; and second means to render said retaining means ineffective thereby to permit said valve to be returned to its initial position.

15. In combination, a translatable element; fluid pressure means to translate said element; a valve to control the rate and direction of translation of said element; means tending to move said valve through a plurality of positions each of which effects a different translation of said element; a member movable with said valve; an interference member; a plurality of abutment surfaces provided by one of said members; a stop shoulder provided by the other of said members, said stop shoulder being adapted successively to engage said abutment surfaces to limit the movement of said valve; and a plurality of dogs carried by said translatable member and acting successively to depress said interference member to cause said abutment surfaces and said stop shoulder successively to be released thereby to permit said valve to be moved to its various operative positions.

In witness whereof, I have hereunto subscribed my name.

ROBERT M. GALLOWAY.